United States Patent
Fukuhara

(10) Patent No.: US 8,438,920 B2
(45) Date of Patent: May 14, 2013

(54) ASSEMBLY STRUCTURE OF LIQUID LEVEL DETECTING APPARATUS AND LIQUID LEVEL DETECTING APPARATUS

(75) Inventor: Toshiaki Fukuhara, Shimada (JP)

(73) Assignee: Yazaki Corporation, Tokyo (JP)

( * ) Notice: Subject to any disclaimer, the term of this patent is extended or adjusted under 35 U.S.C. 154(b) by 267 days.

(21) Appl. No.: 12/886,626

(22) Filed: Sep. 21, 2010

(65) Prior Publication Data
US 2011/0067491 A1    Mar. 24, 2011

(30) Foreign Application Priority Data
Sep. 24, 2009   (JP) ................................. 2009-219561

(51) Int. Cl.
*G01F 23/00* (2006.01)
*G01F 23/32* (2006.01)

(52) U.S. Cl.
USPC ............................................. 73/313; 73/317

(58) Field of Classification Search ................ 73/290 V, 73/313, 317, 866.5
See application file for complete search history.

(56) References Cited

U.S. PATENT DOCUMENTS

| | | | | |
|---|---|---|---|---|
| 7,343,799 | B2* | 3/2008 | Nagakura et al. | 73/317 |
| 2003/0037612 | A1* | 2/2003 | Nagakura et al. | 73/313 |
| 2004/0226366 | A1* | 11/2004 | Pauer et al. | 73/313 |
| 2006/0016256 | A1* | 1/2006 | Bauerle et al. | 73/313 |
| 2008/0141771 | A1* | 6/2008 | Nagakura et al. | 73/317 |
| 2008/0168837 | A1* | 7/2008 | Okada | 73/317 |
| 2008/0289414 | A1* | 11/2008 | Kawaguchi et al. | 73/317 |
| 2009/0000376 | A1 | 1/2009 | Kawaguchi et al. | |
| 2010/0199759 | A1* | 8/2010 | Prasad | 73/317 |

FOREIGN PATENT DOCUMENTS

JP   2009-008535 A   1/2009

\* cited by examiner

*Primary Examiner* — Hezron E Williams
*Assistant Examiner* — David Z Huang
(74) *Attorney, Agent, or Firm* — Sughrue Mion, PLLC

(57) ABSTRACT

An assembly structure of a liquid level detecting apparatus includes a sliding arm having a junction for electrically contacting a resistor and an arm holder attached to the sliding arm. The sliding arm moves according to a liquid level so that the junction slides on the resistor. The sliding arm includes a sliding portion extending in a direction from a base end portion of the sliding arm to the junction, and a pawl portion extending from the base end portion. The arm holder includes a slit into which the pawl portion is inserted and a face on which the sliding portion is mounted. The face is inclined at an angle with respect to an insertion direction of the pawl portion.

4 Claims, 9 Drawing Sheets

ASSEMBLY STRUCTURE OF LIQUID LEVEL DETECTING APPARATUS AND LIQUID LEVEL DETECTING APPARATUS

BACKGROUND

The present invention relates to a liquid level detecting apparatus capable of detecting a liquid height inside a fuel tank etc. of an automobile, and particularly to an assembly structure of a slider used in the liquid level detecting apparatus and the liquid level detecting apparatus using this assembly structure.

A liquid level detecting apparatus constructed so that a float moves up and down according to a liquid level and thereby an electrical contact point moves while sliding on a resistance plate and thereby the liquid level is converted into a potential difference and a liquid height can be detected has been known conventionally as the liquid level detecting apparatus for detecting the height of liquid used as fuel of the inside of a fuel tank of an automobile (for example, Patent Document 1).

A liquid level detecting apparatus 100 described in this Patent Document 1 is an apparatus for detecting a liquid height of the inside of a fuel tank of an automobile etc., and includes a float 101 for moving up and down according to displacement of a liquid level to be measured, a float arm 102, a resistance plate 103 and a slider 104, and the float 101 floating on the level of liquid used as fuel F inside the fuel tank is attached to the top of the float arm 102 as shown in FIGS. 7 and 8.

In FIG. 7, the float arm 102 in which the proximal end side is bent in a vertical direction orthogonal to a paper surface is rotatably supported in a bearing part 110 (see FIG. 8B) in which the proximal end of the float arm 102 is disposed in a frame 105 through the slider 104. Also, the resistance plate 103 and further the slider 104 which includes a conductive slide arm (corresponding to a contact or a contact point spring) 108 and an arm holder 106 integrally assembling this slide arm 108 and slides on the resistance plate 103 in conjunction with rotation of the float arm 102 are attached to the frame 105. In addition, in the drawings, numeral 107 shows a conductive pattern and numeral 109 shows a contact point disposed in the slide arm 108.

Such a liquid level detecting apparatus 100 is constructed so as to perform electrical continuity between the resistance plate 103 and the slide arm 108 assembled in the arm holder 106. And the arm holder 106 turns according to the liquid level L to be detected and a position relative to the resistance plate 103 varies, so that the liquid level L is detected using variations in a resistance value between the resistance plate 103 and the slide arm 108.

Incidentally, an operation of contact between the resistance plate 103 and the slide arm 108 assembled in the arm holder 106 depends on elastic deflection of the slide arm 108, so that a resistance value to be detected cannot be detected accurately when the deflection of the slide arm 108 varies. Hence, for example, by performing insert molding of the slide arm 108 in the case of molding the arm holder 106, the slide arm 108 is integrated with the arm holder 106 and the variations are eliminated.

[Patent Document 1] Japanese Patent Publication Number 2009-8535

However, in such insert molding, workability is bad and cost increases. Hence, the insert molding is avoided and, for example, a method for disposing a caulked part in a fixed surface of the arm holder 106 and caulking the slide arm is also examined. However, in such a method depending on only the caulking, strength of the caulked part may reduce gradually due to deterioration etc. associated with long-term use.

SUMMARY

It is therefore one advantageous aspect of the present invention to provide an assembly structure of a liquid level detecting apparatus capable of simply attaching a slide arm to an arm holder without reducing attachment strength for the long term, and the liquid level detecting apparatus.

According to one aspect of the invention, there is provided an assembly structure of a liquid level detecting apparatus, including:

a sliding arm having a junction for electrically contacting a resistor and configured to move according to a liquid level so that the junction slides on the resistor, the sliding arm including a sliding portion extending in a direction from a base end portion of the sliding arm to the junction, and a pawl portion extending from the base end portion; and an arm holder attached to the sliding arm and including a slit into which the pawl portion is inserted and a face on which the sliding portion is mounted, the face being inclined at an angle with respect to an insertion direction of the pawl portion.

The sliding portion may be formed with a pin hole at a side of the base end portion, and the arm holder may include a pin which is cramped after inserted into the pin hole.

A gap of the slit may be gradually narrowed according to an direction opposite to the insertion direction.

According to another aspect of the invention, there is provided a liquid level detecting apparatus including the sliding arm and the arm holder.

DETAILED DESCRIPTION OF EXEMPLIFIED EMBODIMENTS

Embodiments of the invention will hereinafter be described in detail with reference to the accompanying drawings.

Figure 1:
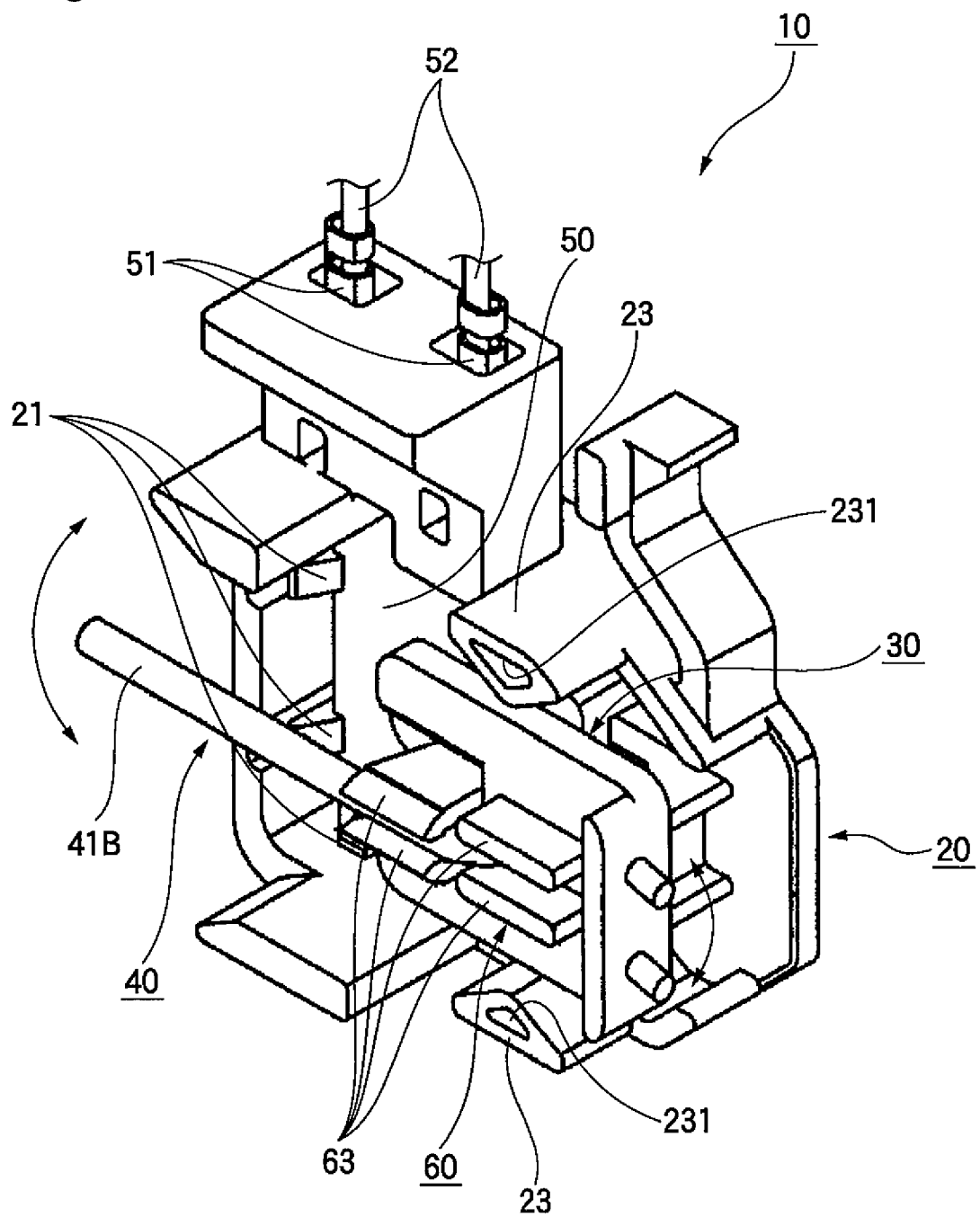
FIG. 1 is a perspective view showing a main part of a liquid level detecting apparatus according to a first embodiment of the invention.
Figure 2:
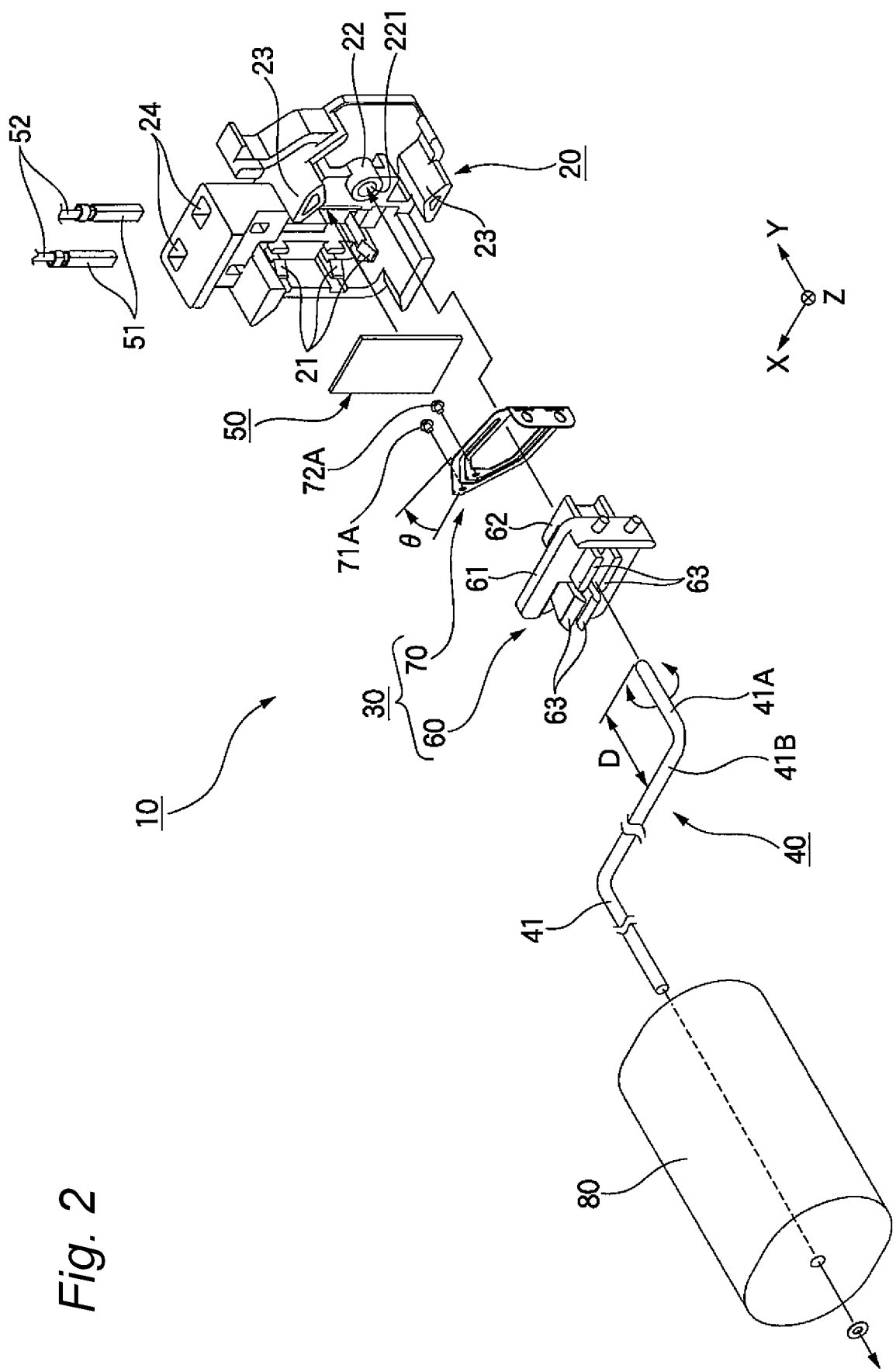
FIG. 2 is an exploded perspective view showing its liquid level detecting apparatus.

FIGS. 1 and 2 show a liquid level detecting apparatus to which a an assembly structure of a slider according to the invention is applied, and this liquid level detecting apparatus 10 includes a frame 20, the slider 30 and a float arm 40 as a rough configuration.

The frame 20 is means for attaching a resistance plate 50 in which resistors (not shown) having plural conductive segments are disposed on an insulating substrate, and is formed in substantially a box shape in which one surface (inner surface) is opened, and the resistance plate 50 is fastened and fixed by pawl members 21 disposed in plural places of this opened inner surface. Also, in this frame 20, a bearing part 22 and a pair of walls 23 are disposed in the opened inner surface.

Among these, the bearing part 22 is formed in a state of being erected in a direction vertical to the inner surface of the frame 20 in order to fasten the proximal end of the float arm 40 in a rotatable state as shown in FIG. 2. On the other hand, the walls 23 are constructed so as to attach the liquid level detecting apparatus 10 to a fuel tank by inserting a pair of protrusions formed in a wall surface etc. of the fuel tank into hollow holes 231 of the walls 23 in the case of attaching the liquid level detecting apparatus 10 to the fuel tank of the outside of illustration.

Further, terminal holes 24 from which plus/minus terminals 51 connected to plus/minus electrodes of the outside of illustration disposed in the resistance plate 50 are extracted are disposed in this frame 20, and the plus/minus terminals 51 extracted from the terminal holes 24 are connected to conductive wires 52.

Figure 3A:
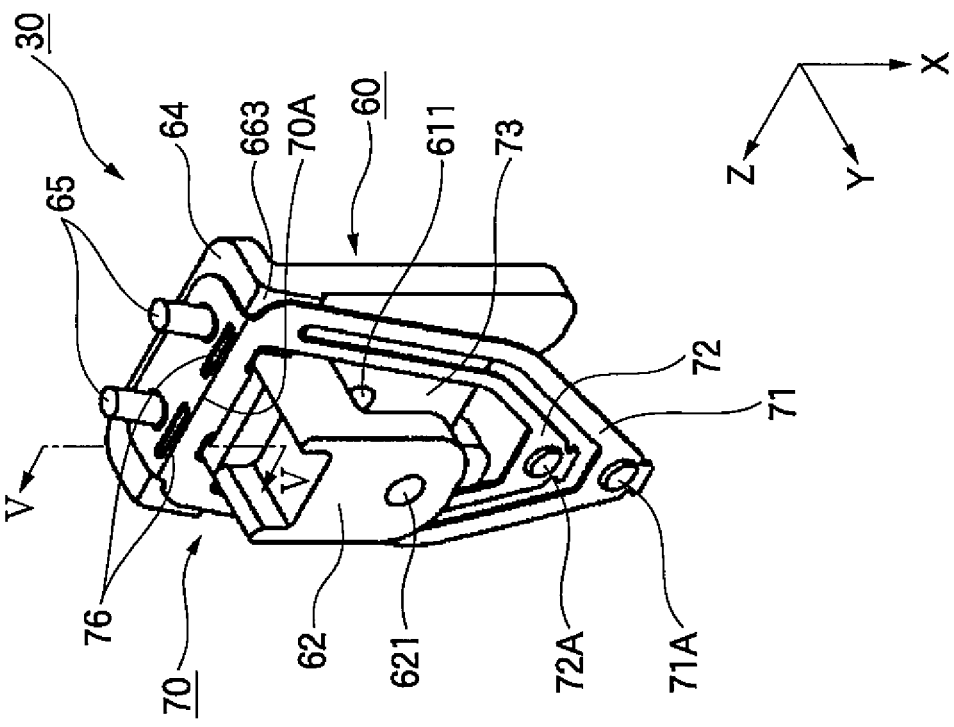
FIG. 3A is a perspective view showing an assembly structure of a slider according to the invention.

As shown in FIG. 3, the slider 30 is constructed of an arm holder 60 and a slide arm 70, and the slide arm 70 is assembled in the arm holder 60. In the slider 30, the float arm 40 turns according to displacement of a liquid level of liquid (fuel) in a state of being supported (pinched) in the frame 20 and thereby contact points 71A, 72A (described below) disposed in the slide arm 70 make sliding contact with the conductive segments and slide on the conductive segments.

Figure 4A:
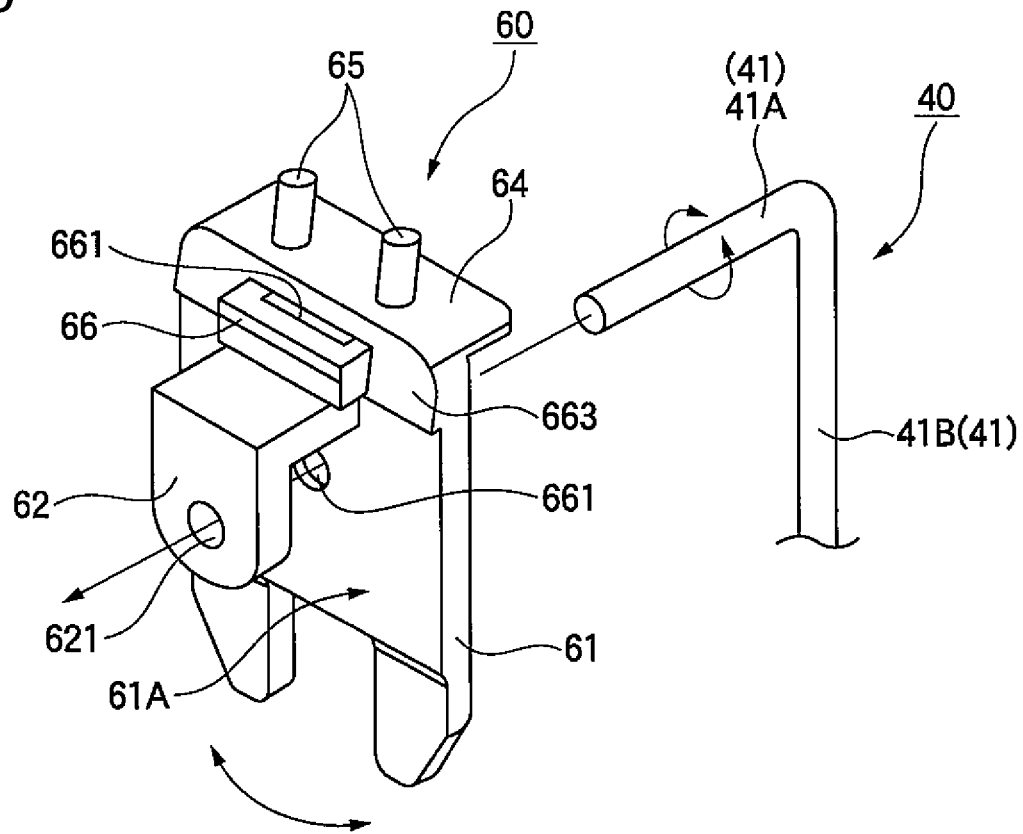
FIG. 4A is a perspective view showing a state of the case of attaching an arm shaft of a float arm to an arm holder of the slider.
Figure 4B:
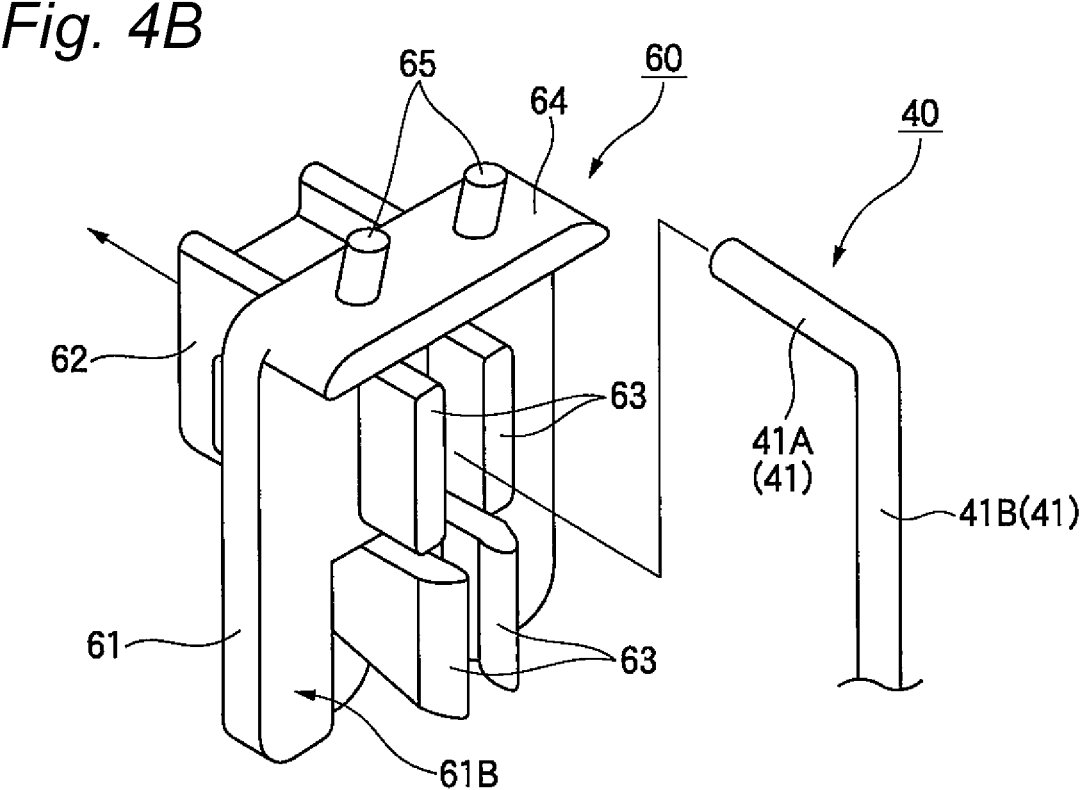
FIG. 4B is a perspective view showing a state of assembly for constraining the arm shaft of the float arm to the arm holder of the slider.

The arm holder 60 of the present embodiment includes substantially a rectangular plate-shaped body 61 formed by a proper resin material, a pivotal support protrusion part 62 and pinching walls 63 respectively disposed in a back surface (surface facing the frame 20 in FIG. 1) 61A of this body 61 and a front surface 61B opposite to this back surface 61A, and a protrusion piece 64 having a pair of pins 65 for caulking protruded and disposed in one end (hereinafter called a "proximal part") of the body 61 as shown in FIG. 4. Further, a pressing part 66 for disposing a slit 661 for press-in as shown in FIGS. 4A and 5 in the back surface 61A of the body 61 is annexed to the arm holder 60.

A pivotal support hole 621 through which an arm shaft 41 of the float arm 40 fitted into a through hole 611 bored in the center of the back surface 61A of the body 61 simultaneously penetrates is disposed in the pivotal support protrusion part 62.

The pinching walls 63 are configured to respectively erect two sets of a pair of right and left walls, that is, four walls in all in the front and back of the front surface 61B of the body 61. And the arm shaft 41 of the float arm 40 is constrained so as not to cause a positional deviation every each set, respectively.

Figure 5:
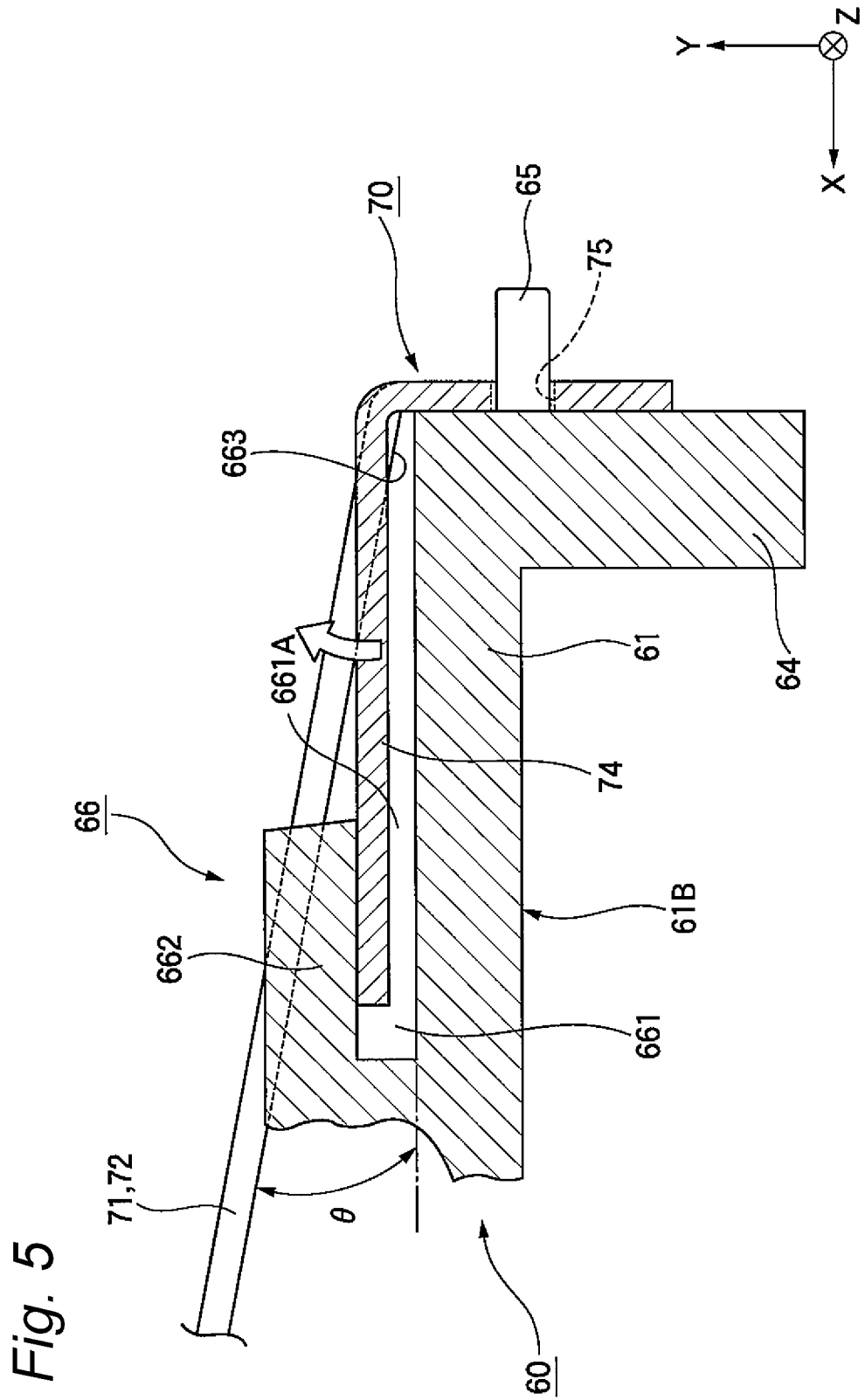
FIG. 5 is an explanatory diagram showing interaction between an elastic wall of the arm holder and the slider of the invention.

The pressing part 66 of the embodiment includes an elastic wall 662 installed in order to form the slit 661 in an outside surface of the body 61, and a fixed surface 663 which is formed in both sides of this elastic wall 662 and has an inclination with a predetermined angle θ with respect to an extension direction of the elastic wall 662 as shown in FIG. 5. The slit 661 is opened toward the proximal part (right end in FIG. 5) of the body 61 and is formed between the outside surface of the body 61 and the elastic wall 662. In the case of assembling the slide arm 70 in the arm holder 60, a pawl part 74 described below is inserted into the slit 661 and a portion of slide parts 71, 72 described below is placed on the fixed surface 663. Accordingly, the fixed surface 663 is inclined at the predetermined angle with respect to an inserting direction of the pawl part 74.

The slide arm 70 of the embodiment is formed by a proper conductive material and also electrodes 71A, 72A used as the contact points are disposed in two places by the free end of the slide parts 71, 72. In addition, these electrodes 71A, 72A make contact with the two conductive segments of the outside of illustration described above and slide on the conductive segments and make sliding contact with the conductive segments.

Further, the slide arm 70 of the embodiment is disposed in a state in which the slide parts 71, 72 bent in the outside direction by an angle of θ° further than an (X) direction orthogonal to a proximal end surface are divided into two places by the free end in a folded part 70A as shown in FIG. 3. That is, this slide arm 70 has a shape in which the free end side showing a pointed shape is inclined in a direction closer toward the resistance plate 50 than the proximal end side. In addition, an opening 73 opened largely is disposed inside the slide part 72 and the pivotal support protrusion part 62 is inserted into this opening 73.

Also, the electrodes 71A, 72A used as the contact points are attached to the free end sides of the slide parts 71, 72 in this slide arm 70. Further, this slide arm 70 has the pawl part 74 for press-in showing a tongue piece shape in the portion facing the opening 73 in the vicinity of the folded part 70A, and this pawl part 74 is pressed in the slit 661 disposed in the pressing part 66 of the arm holder 60. In the slide arm 70 before being assembled in the arm holder 60, the slide parts 71, 72 and the pawl part 74 are included in the same plane.

Further, in this slide arm 70, a pair of right and left pin holes 75 are formed in the proximal end part, and the pins 65 disposed in the protrusion piece 64 of the proximal part of the arm holder 60 are inserted into the pin holes 75 and are caulked. Also, in the vicinity of the pin holes 75 by the folded part 70A, elongated holes (or may be perforations etc.) 76 with a narrow shape are bored so as to pair off with each of the pin holes 75. The elongated holes 76 are constructed so that when the folded part 70A is formed by being folded at a predetermined angle in the desired portion by the proximal end part of the slide arm 70, force necessary for its folding is diminished and the folded part 70A is surely folded linearly and is formed.

The float arm 40 includes the arm shaft 41 whose proximal end side is folded in a crank shape, and a float 80 which is made of a material lighter than specific gravity of liquid (gasoline of automobile fuel in the embodiment) to be detected and is fastened in the top of the arm shaft 41, and the float arm 40 turns up and down in conjunction with up-and-down operations of the liquid level.

The arm shaft 41 is constructed so that the proximal end part is inserted into the pivotal support hole 621 and the through hole 611 of the arm holder 60 and also rotation of the proximal end part is retained by the pinching walls 63 and the arm holder 60 and the slide arm 70 integrated with this arm holder 60 turn in conjunction with a turn operation of the arm shaft 41. In addition, the proximal end of the arm shaft 41 is rotatably mounted in a shaft hole 221 of the bearing part 22.

Next, a method for assembling the slide arm 70 in the arm holder 60 will be described.

First, the resistance plate 50 (constructing the resistors) is fastened to the pawl members 21 of the frame 20 and also the plus/minus terminals 51 of the conductive wires 52 are inserted into the terminal holes 24 and are electrically connected to the plus/minus electrodes (not shown) of the resistance plate 50 by solder and other proper means as shown in FIG. 2.

Figure 3B:
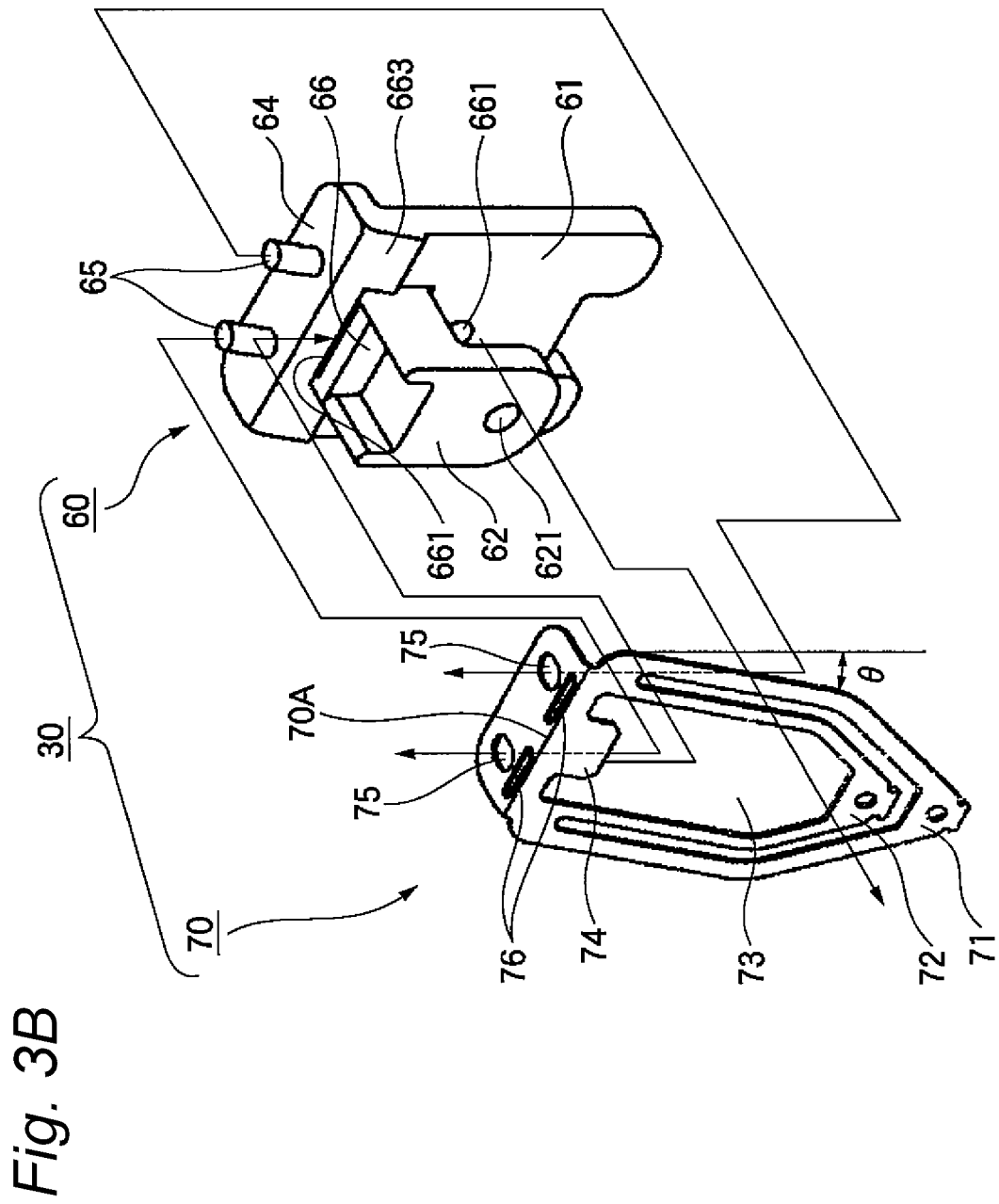
FIG. 3B is an exploded perspective view of the assembly structure.

Next, the slide arm 70 is assembled in the arm holder 60 and the slider 30 is assembled. In the method for assembling the slide arm 70 in this arm holder 60 herein, the pawl part 74 of the slide arm 70 is pressed in the slit 661 disposed in the pressing part 66 of the arm holder 60 as shown in FIG. 3B (the details of the main part see FIG. 5). At the same time, the pins 65 of the arm holder 60 are inserted into the pin holes 75 of this slide arm 70. In order to insert the slit 661 into the pawl part 74, the slide arm 70 is slid with respect to the arm holder 60 and as shown in FIG. 5, while elastic force by which the pawl part 74 tends to become the same plane as the slide parts 71, 72 by the elastic wall 662 is pushed, the slide parts 71, 72 are held at a predetermined angle θ with respect to the pawl part 74 (more specifically, an insertion direction of inserting the pawl part 74 into the slit 661) inserted into the slit 661 by the fixed surface 663. In this state, the slide arm 70 tends to move in a direction opposite to the direction of inserting the pawl part 74 into the slit 661 with respect to the arm holder 60 in order to relieve the elastic force.

Hence, the pins 65 of the arm holder 60 inserted into the pin holes 75 of the slide arm 70 are caulked in a state of sliding the slide arm 70 with respect to the arm holder 60 until the pin holes 75 are positioned in the roots of the pins 65. In addition, this caulking refers to work in which the pins 65 made of plastic resin are crushed by thermal welding, ultrasonic welding, vibration welding, etc. and the pin holes 75 of the slide arm 70 are closed and also the pin holes 75 are positioned and fixed. A situation in which the slide arm 70 tends to move in the direction opposite to the direction of inserting the pawl part 74 into the slit 661 with respect to the arm holder 60 is suppressed by the pins after being crushed.

Then, the slider 30 completed by being assembled integrally in this manner is arranged in a predetermined position of the frame 20.

Thereafter, the proximal end side (right end side in FIG. 2) of the arm shaft 41 of the float arm 40 in which the float 80 is assembled in the top is inserted into the through hole 611 and the pivotal support hole 621 in order of the through hole 611 and the pivotal support hole 621 (respectively see FIG. 3). The proximal end part of the arm shaft 41 is attached to the bearing part 22 rotatably in a state in which the proximal end part does not pull out.

In addition, in the case of integrating the arm shaft 41 with the slider 30 herein, a second crank part 41B can be pinched by the pinching walls 63 by making a length D (where a length of the amount inserted into a hole of the bearing part 22 is excluded) of a first crank part 41A of the proximal end side of the arm shaft 41 equal to a thickness of the slider 30. In other words, the slider 30 could be pinched in a rotatable state without backlash between the bearing part 22 and the second crank part 41B of the arm shaft 41.

According to the embodiment described above, the liquid level detecting apparatus 10 having the assembly structure of the slider 30 capable of simply attaching the slide arm 70 to the arm holder 60 in a state of avoiding the insert molding in which workability is bad and cost increases can be implemented.

That is, according to the embodiment, the method depending on only the caulking in which strength in the caulked part may reduce gradually due to deterioration etc. associated with long-term use is also avoided. In other words, the slide arm 70 is attached to the arm holder 60 by the press-in and caulking. Therefore, the liquid level detecting apparatus 10 having the assembly structure of the slider 30 attached without reducing strength of attachment of the slide arm 70 to the arm holder 60 for the long term at low cost can be implemented.

Particularly in the portion of attachment of the slide arm 70 to the arm holder 60, a state in which the pawl part of the slide arm is inserted into the slit and the slide parts of the slide arm are placed on the fixed surface can surely be implemented by caulking the pins of the arm holder in a state of penetrating through the pin holes as shown in FIG. 5. As a result of this, elastic force (that is, force by which the pawl part tends to be restored in the same direction as the extension direction of the slide parts or force by which the slide parts tend to be restored in the same direction as the extension direction of the pawl part) of the slide arm can be utilized sufficiently as holding force for fixing the slide arm to the arm holder.

Next, a second embodiment of the invention will be described with reference to FIG. 6. In addition, in the present embodiment, the overlap description is avoided by assigning the same numerals to the same portions as those of the first embodiment.

Figure 6:
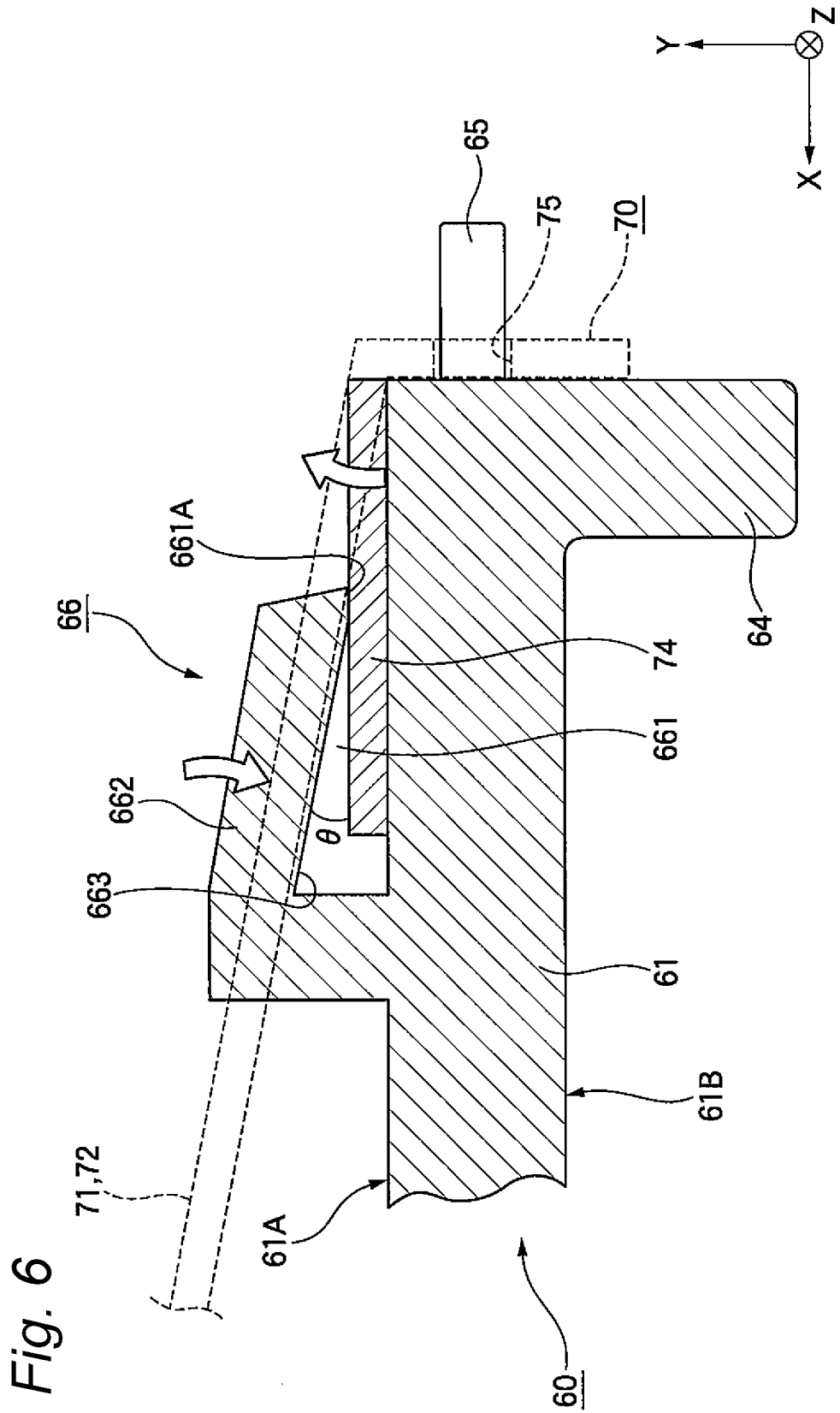
FIG. 6 is an explanatory diagram showing action of a pawl part of a slider according to a second embodiment of the invention.
Figure 7:
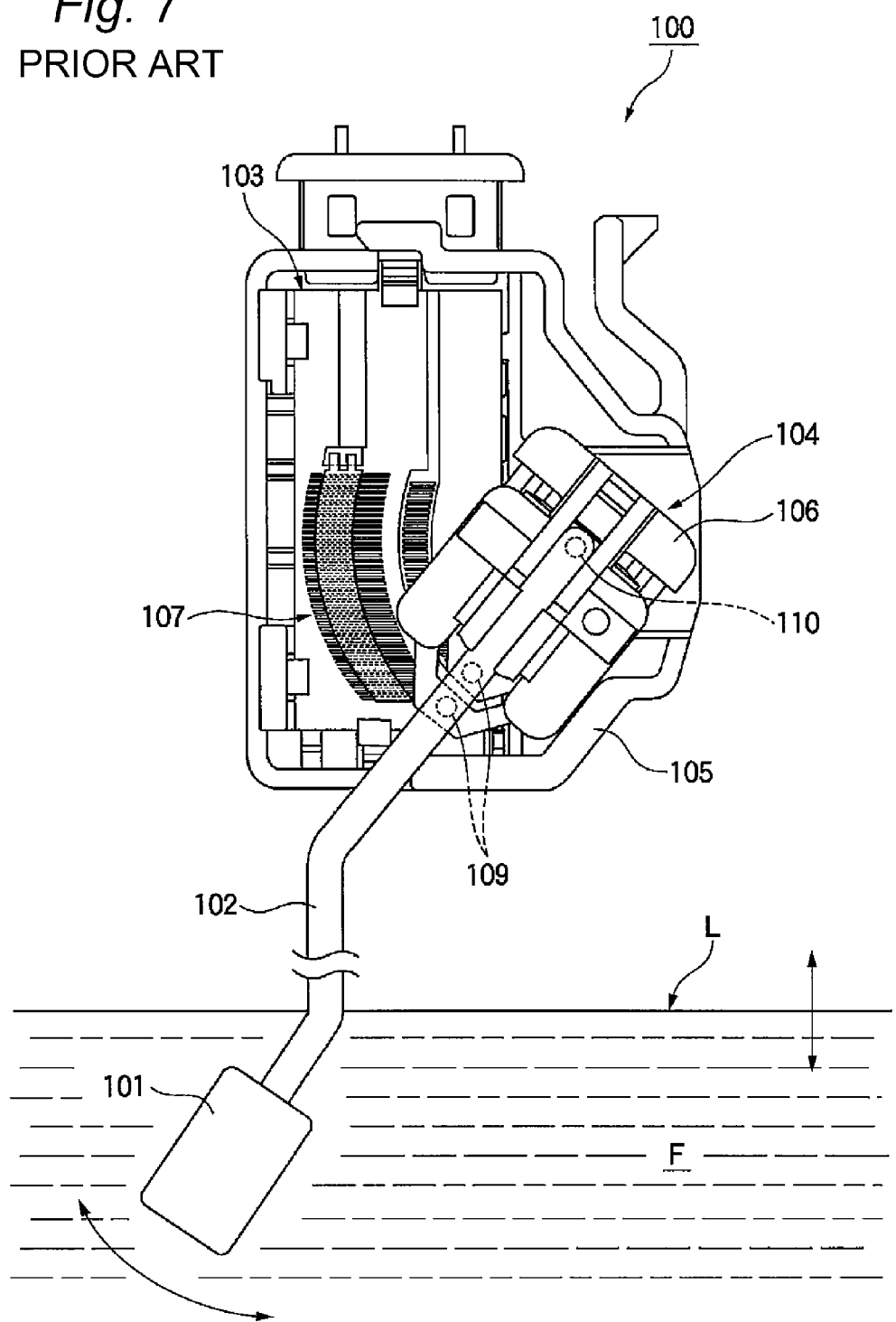
FIG. 7 is a plan view showing a conventional liquid level sensor.
Figure 8A:
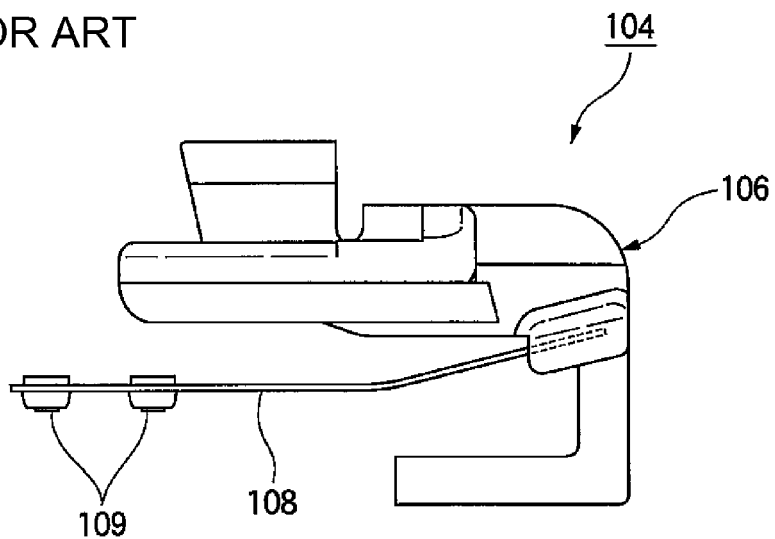
FIG. 8A is a side view of a slider of the liquid level sensor.
Figure 8B:
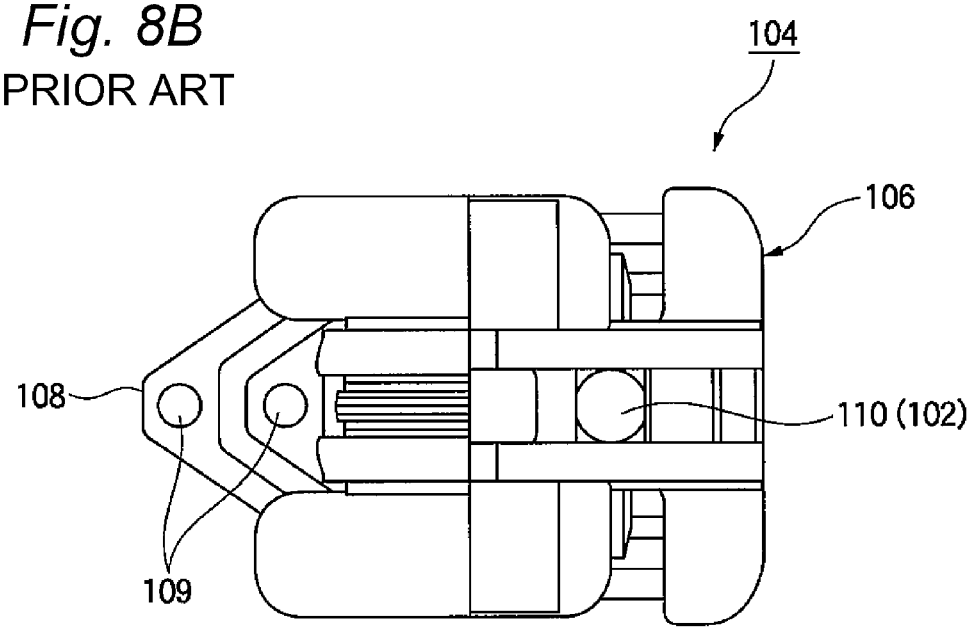
FIG. 8B is a plan view of the slider.

A liquid level detecting apparatus to which an assembly structure of a slider of the embodiment shown in FIG. 6 is applied differs from the liquid level detecting apparatus 10 of the first embodiment in that an elastic wall 662 narrows gradually toward an inlet 661A of a slit 661 particularly in a pressing part 66 of an arm holder 60. In other words, a gap of the slit 661 is gradually narrowed according to a direction opposite to the insertion direction of the pawl part 74

That is, the pressing part 66 of the embodiment has the elastic wall 662 in which the inlet 661A narrows gradually at an acute angle θ toward a proximal part (right end in FIG. 6) of a body 61, and a fixed surface 663 which is formed in both sides of this elastic wall 662 and has an inclination with a predetermined angle θ with respect to an extension direction of the elastic wall 662 as shown in FIG. 6. The slit 661 is opened toward the proximal part (right end in FIG. 5) of the body 61 to the extent that a pawl part 74 can be inserted, and is formed between the outside surface of the body 61 and the elastic wall 662.

As described above, the elastic wall 662 narrows gradually toward the inlet 661A and thereby, the end of the side of the inlet 661A of the elastic wall 662 pinches the pawl part 74 inserted into the slit 661 between the end and the outside surface of the body 61. As a result of this, the pawl part 74 is surely held inside the slit 661. This eliminates backlash of the pawl part 74, for example, in a process of inserting the pawl part 74 into the slit 661, so that a slide arm 70 can be assembled in the arm holder 60 more easily.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The disclosures of Japanese Patent Application No. 2009-219561 filed Sep. 24, 2009 including specification, drawings and claims is incorporated herein by reference in its entirety.

What is claimed is:

1. An assembly structure of a liquid level detecting apparatus, comprising:
    a sliding arm having a junction for electrically contacting a resistor and configured to move according to a liquid level so that the junction slides on the resistor, the sliding arm including a sliding portion extending in a direction from a base end portion of the sliding arm to the junction, and a pawl portion extending from the base end portion; and an arm holder attached to the sliding arm and including a slit into which the pawl portion is inserted and a face on which the sliding portion is mounted, the face being inclined at an angle greater than zero with respect to an insertion direction of the pawl portion.

2. The assembly structure as set forth in claim 1, wherein the sliding portion is formed with a pin hole at a side of the base end portion, and the arm holder includes a pin which is crimped after inserted into the pin hole.

3. The assembly structure as set forth in claim 1, wherein a gap of the slit narrows according to a direction opposite to the insertion direction.

4. The assembly structure as set forth in claim 2, wherein a gap of the slit narrows according to a direction opposite to the insertion direction.

* * * * *